(12) United States Patent
Anderson et al.

(10) Patent No.: US 8,805,903 B2
(45) Date of Patent: Aug. 12, 2014

(54) EXTENDED-WIDTH SHIFTER FOR ARITHMETIC LOGIC UNIT

(75) Inventors: Timothy D. Anderson, Dallas, TX (US); Shriram D. Moharil, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 501 days.

(21) Appl. No.: 13/175,938

(22) Filed: Jul. 4, 2011

(65) Prior Publication Data

US 2012/0016919 A1    Jan. 19, 2012

Related U.S. Application Data

(60) Provisional application No. 61/365,184, filed on Jul. 16, 2010.

(51) Int. Cl.
*G06F 5/01*    (2006.01)

(52) U.S. Cl.
USPC ............................................. 708/209

(58) Field of Classification Search
None
See application file for complete search history.

(56) References Cited

U.S. PATENT DOCUMENTS

| | | | |
|---|---|---|---|
| 6,233,642 B1 * | 5/2001 | Yaniv et al. | 710/316 |
| 2011/0004643 A1 * | 1/2011 | Tajiri | 708/209 |
| 2012/0016919 A1 * | 1/2012 | Anderson et al. | 708/209 |
| 2013/0103730 A1 * | 4/2013 | Lee et al. | 708/200 |

\* cited by examiner

*Primary Examiner* — David H Malzahn
(74) *Attorney, Agent, or Firm* — Robert D. Marshall, Jr.; Frederick J. Telecky, Jr.

(57) ABSTRACT

A processor includes a shift device for extending the width of a rotator without increasing propagation delays. An extended-width result is obtained by combining a rotation result with a shift result in accordance with a mask that is selected in response to at least a portion of the value of the degree to which a data word is to be shifted.

17 Claims, 4 Drawing Sheets

EXTENDED-WIDTH SHIFTER FOR ARITHMETIC LOGIC UNIT

CLAIM OF PRIORITY

This application for Patent claims priority to U.S. Provisional Application No. 61/365,184 entitled "A TECHNIQUE TO IMPLEMENT 40-BIT LEFT SHIFTS BY EFFICIENTLY REUSING A 32-BIT ROTATOR/EXTRACTOR TO IMPROVE OVERALL DSP PROCESSOR PERFORMANCE, WHILE REDUCING AREA AND POWER" filed Jul. 16, 2010, wherein the application listed above is incorporated by reference herein.

BACKGROUND

One type of the instructions used in general-purpose processors is a shift instruction. A shift instruction is typically a two-operand instruction. In the execution of this instruction, the data to be shifted is typically contained in one of the source operands, while the amount by which the data is to be shifted is contained in a second source operand. For the specific example of signed 32-bit data, the result is limited to 0x7FFFFFFFh, which is thus considered to be the highest positive number that can be accurately represented as signed 32-bit data. For shifting operands in which more than 32 bits of data is needed, additional logic is needed for the computation of the result. The computation for this result is often part of a timing critical path, especially if the instruction is to be executed in a single cycle, and thus can be limiting to the speed of a processor.

SUMMARY

The problems noted above are solved in large part by providing a shift device for extending the width of a rotator without increasing propagation delays. An extended-width result is obtained by combining a rotation result with a shift result in accordance with a mask that is selected in response to at least a portion of the value of the degree to which a data word is to be shifted. A combined shift result having a width that is greater than the width of the rotation result can be produced by combining the output of the rotator with the extended-width result to form a combined shift result having a width that is greater than the width of the rotator.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and appended claims to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . " Further, the meaning of the term "or" (as an inclusive or an exclusive "or") is determined by the surrounding context in which the term is used. Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. The term "left-shift" is used herein for simplicity and is used to describe a shifting of binary digits from a lesser order to a higher order.

Figure 1:
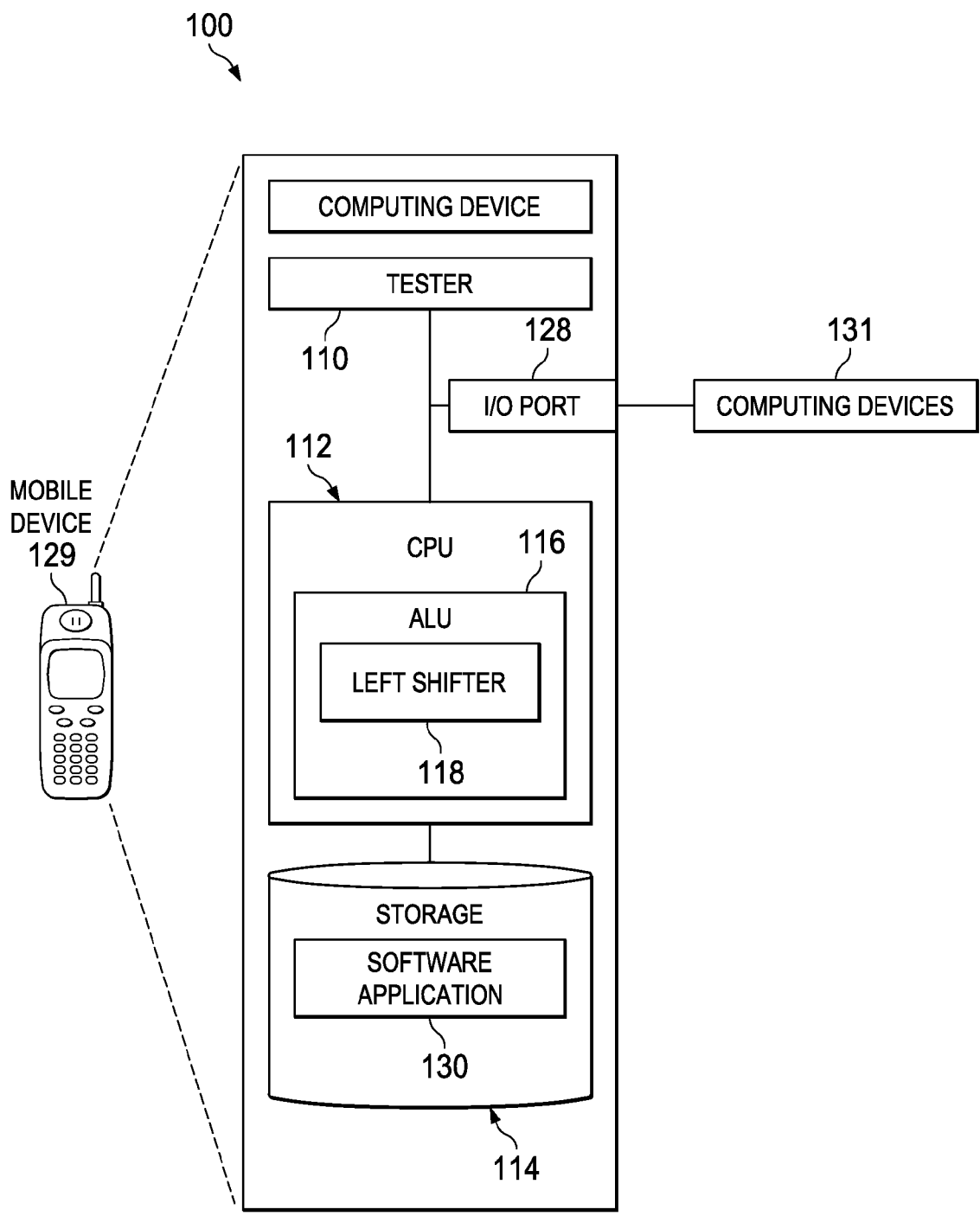
FIG. 1 shows an illustrative computing device 100 in accordance with embodiments of the disclosure.

FIG. 1 shows an illustrative computing device 100 in accordance with embodiments of the disclosure. The computing device 100 is, or is incorporated into, a mobile communication device 129, such as a mobile phone, a personal digital assistant (e.g., a BLACKBERRY® device), a personal computer, or any other type of electronic system.

In some embodiments, the computing device 100 comprises a megacell or a system-on-chip (SoC) which includes control logic such as a CPU 112 (Central Processing Unit), a storage 114 and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as random access memory (RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 typically comprises memory and logic which store information frequently accessed from the storage 114. The CPU 112 is arranged to control and/or implement arithmetic functions used during the execution the software application 130. Such functions are often executed by an arithmetic logic unit (ALU) such as ALU 116. ALU 116 includes a left-shifter 118, which is often used to perform various types of shift operations encountered in various arithmetic operations. Portions of ALU 116 can be distributed amongst other components of the CPU 112 and need not be physically located within a portion of the die (e.g., chip) reserved exclusively for the ALU 116. The CPU 112 is coupled to I/O (Input-Output) port 128, which provides an interface (that is configured to receive input from (and/or provide output to) peripherals and/or computing devices 131, including tangible media (such as flash memory) and/or cabled or wireless media (such as a Joint Test Action Group (JTAG) interface).

Figure 2:
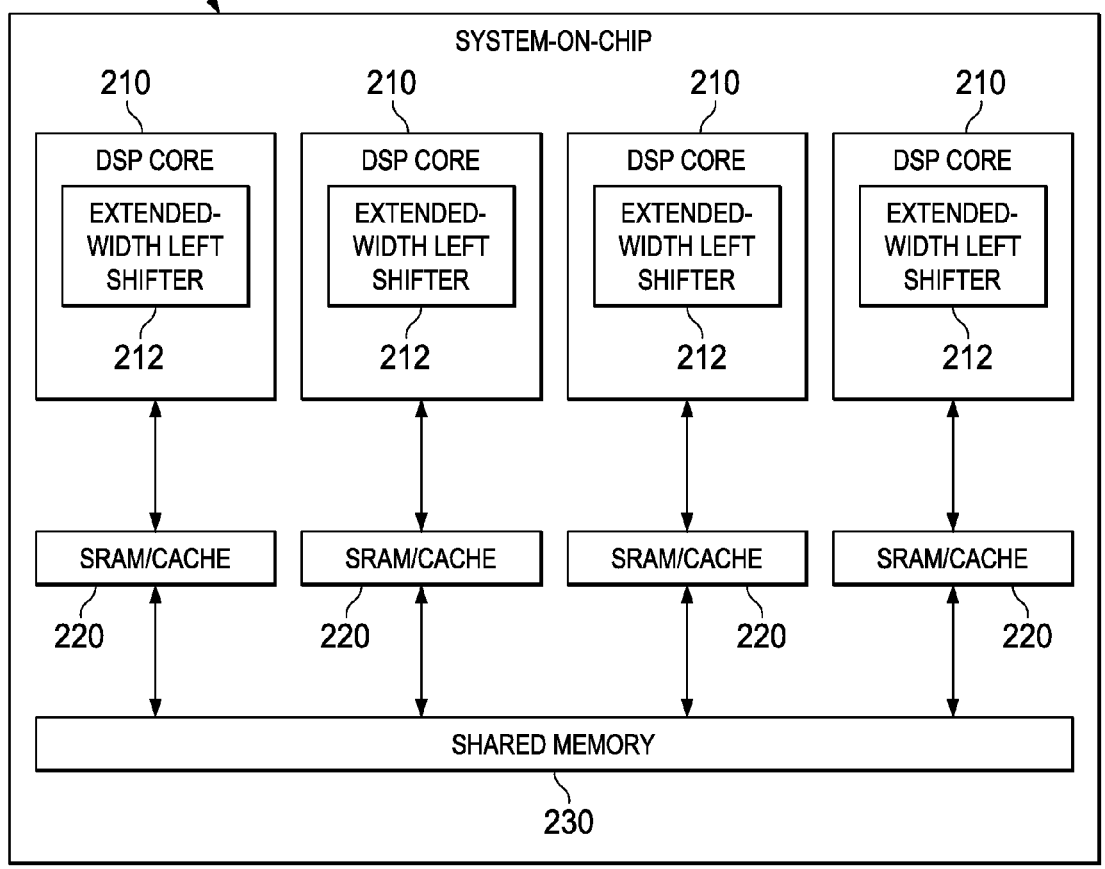
FIG. 2 is a block diagram illustrating a computing system including an extended-width left-shifter in accordance with embodiments of the disclosure.

FIG. 2 is a block diagram illustrating a computing system including an extended-width left-shifter in accordance with embodiments of the disclosure. Computing system 200 is illustrated as an SoC including one or more DSP cores 210, SRAM/Caches 220, and shared memory 230. Although the illustrated elements of the computing system 200 are formed using a common substrate, the elements can also be implemented in separate circuit boards and packages (including the shared memory 230).

Each DSP core 210 optionally includes an extended-width left-shifter 212 for executing various arithmetic instructions of an instruction set that (for example) are used to extract signal information from data received by computing system 200. Each DSP core 210 has a local memory such as SRAM/Cache 220 to provide relatively quick access to read and write memory. Additionally, each DSP core 210 is coupled to a shared memory 230, which usually provides slower (and typically less expensive) memory accesses than SRAM/Cache 220. The shared memory 230 stores program and data information that can be shared between each DSP core 210.

Certain DSP processors are designed to operate on 32-bit data. However, a commonly used instruction in such DSP processors is a 40-bit "Left Shift" instruction which is usually implemented in a separate sub-unit dedicated to shift instructions. A purpose of the 40-bit left shift is to allow extra guard bits that preserve shifted data even when the data is shifted past the 32-bit boundary, as used by certain applications. The left shifts typically need to be executed in a single clock cycle, thereby making them timing-critical.

As disclosed herein, the extended-width left-shifter 212 reduces the number of logic levels used in physically implementing these instructions. The reduction of the number of logic levels contributes substantially to an improved overall DSP clock frequency because signal propagation paths are shortened by the reduction of the number of logic levels. Also, power and area requirements used while implementing these instructions are reduced, which improves system-level power and area budgets. Thus, adding an extra level of logic (as used in conventional designs) to expand conventional 32-bit designs to include 40-bit left-shifts is avoided (and thus avoids lengthening signal propagation delays). The disclosed extended-width left-shifter 212 reuses a portion of a 32-bit shifter to implement a 40-bit left shift, which avoids increasing delays within the overall critical path in the logic, and also typically provides area and power savings.

Figure 3:
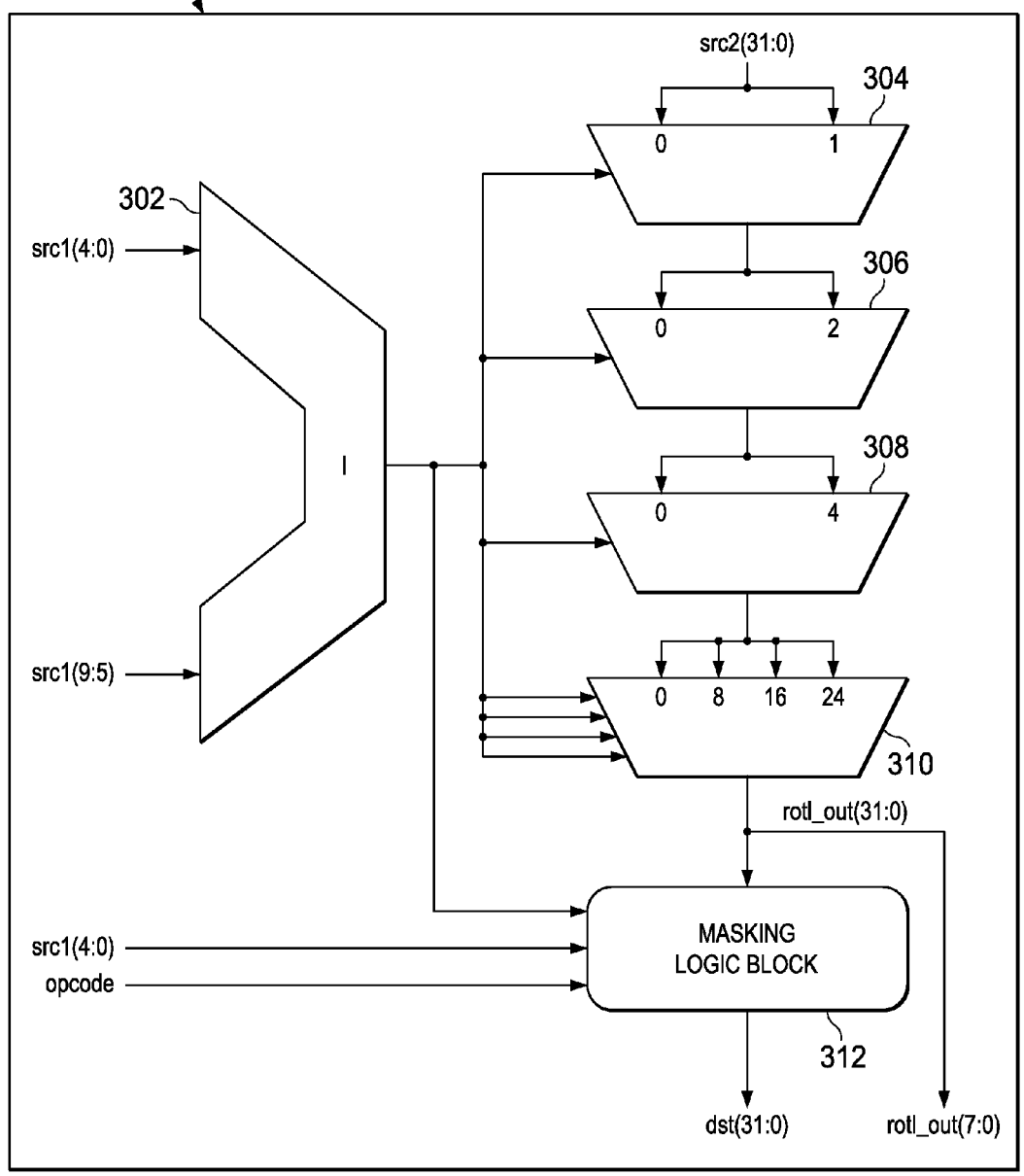
FIG. 3 is a logic diagram illustrating a 32-bit rotator of an extended-width left-shifter in accordance with embodiments of the disclosure.

FIG. 3 is a logic diagram illustrating a 32-bit rotator of an extended-width left-shifter in accordance with embodiments of the disclosure. Rotator 300 has a four-stage barrel shifter architecture and includes a shift-amount controller 302, a first-stage multiplexer 304, a second-stage multiplexer 306, a third-stage multiplexer 308, a fourth-stage multiplexer 310, and masking logic block 312.

Rotator 300 is arranged to receive a first operand for specifying the amount of a shift (shift degree) and a second operand that is to be shifted by the shift degree. Rotator 300 is illustrated as a 32-bit rotator and is arranged to perform a 32-bit extraction, left-shift and right-shift with the correct masking (Extraction is, for example, selecting a field of bits from within a word that is identified by a desired starting place and length in the word.) Rotator 300 receives masking information in the form of an opcode received by masking logic block 312. The second operand (which contains the data that is to be shifted by the shift degree) is shown to appear on (source no. 2) bus src2(31:0), which is coupled to the first-stage multiplexer 304. To implement a 32-bit extract instruction, the (source no. 1) bus src1(9:0) is coupled to the shift-amount controller 302: the left-shift degree is contained in src1 (4:0) while the right-shift degree is contained in src1(9:5). For other kinds of 32-bit shift instructions (such as the 32-bit left shift, right shifts, and left rotates), the shift degree is contained in src1(4:0).

In operation, the shift-amount controller 302 provides control signals to each stage multiplexer (e.g., the first-stage multiplexer 304, the second-stage multiplexer 306, the third-stage multiplexer 308, and fourth-stage multiplexer 310), wherein the control signals are generated in accordance with an amount and direction to shift the data in src2(31:0). Each multiplexer selectively shifts the input data using the control signals and the "hard" wiring of the output of a lower stage to the inputs of a next-higher order stage. For example, the first-stage multiplexer 304 is arranged to selectively shift the data in src2(31:0) by one bit-position under the control of the shift-amount controller 302 (the first input containing non-shifted data, and the second input containing data pre-shifted by one bit using hard wiring). The second-stage multiplexer 306 is arranged to selectively shift (by selecting between a non-shifted input and an input pre-shifted two bits using hard wiring) the selected input data from by two bit-positions under the control of the shift-amount controller 302. The third-stage multiplexer 308 is arranged to selectively shift the data in src2(31:0) by four bit-positions under the control of the shift-amount controller 302. The fourth stage multiplexer 310 is arranged to selectively shift the data in src2(31:0) by a selection of 8, 16, and 24 bit-positions under the control of the shift-amount controller 302. The selectively shifted output of the stage multiplexer 310 is provided using (rotate-left output no. 1) bus rotl_out(31:0). The lower-order bits rotl_out(7:0) of bus rotl_out are arranged to be used to extend the width of a shift operation as discussed below with reference to FIG. 4.

Masking logic block 312 receives rotl_out(31:0) and masks the received receives rotl_out(31:0) in accordance with a received opcode and src1(4:0), which specifies the amount the received to-be-shifted operand is to be shifted. For example, during a left shift instruction, masking logic block 312 receives rotl_out(31:0), which contains shifted bits shifted by the amount specified in src1(4:0). The masking logic block 312 uses src1(4:0) to determine which bits to mask, and uses the received opcode to determine how to mask the bits. Notably, the masking logic block 312 typically adds a delay roughly equivalent to the delays provided using one to two multiplexers (implemented using the same design rules as the masking logic block 312).

Figure 4:
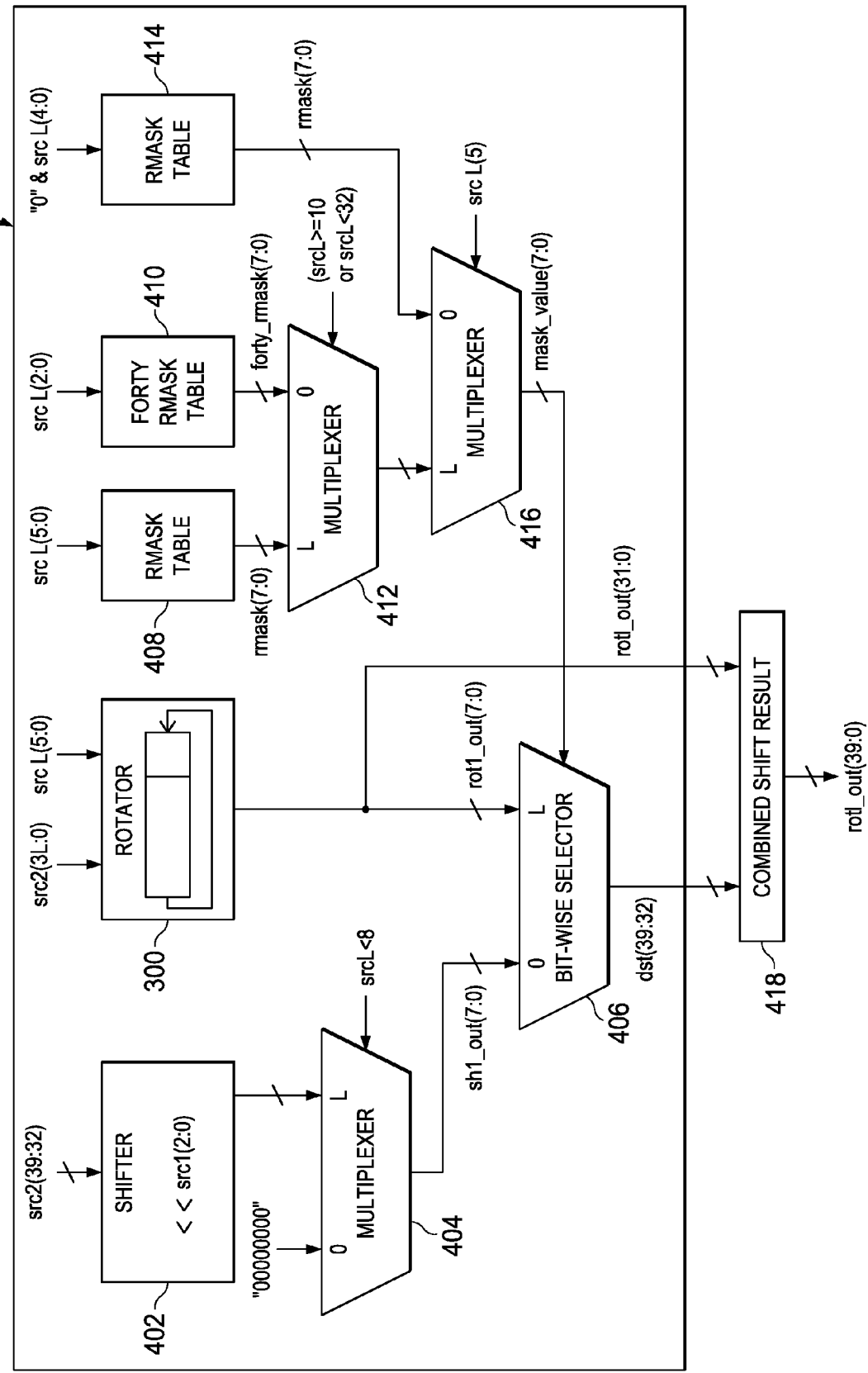
FIG. 4 is logic diagram illustrating an extended-width left-shifter in accordance with embodiments of the disclosure.

FIG. 4 is logic diagram illustrating an extended-width left-shifter in accordance with embodiments of the disclosure. Extended-width left-shifter 400 includes rotator 300 as discussed above, and for the 40-bit left-shifts, receives the lower-order bits rotl(7:0) from rotator 300. Extended-width left-shifter 400 uses an extra bit in the shift degree (which is src1(5)) and eight extended-width bits in the shift data (which are src2(39:32)) to extend 32-bit left shifts to a 40-bit left shift.

To extend the shift to a 40-bit left shift, the lower 32 bits of the data are obtained from rotator 300 via (distribution) bus dst(31:0). The lower 32 bits of the data are correctly produced by rotator 300 because the masking logic block 312 in FIG. 3 is responsive to src1(4:0) and src2(31:0), which correctly control shifts of up to 32 bits. Accordingly, the output of the left rotator rotl_out(31:0) when passed through the masking logic, correctly yields the correct result for the lower 32-bits of the 40-bit left shift result. Thus, extended-width left-shifter 400 provides control logic to determine the upper eight bits of the result "dst(39:32)" for performing 40-bit left shifts.

The arrangement of extended-width left-shifter 400 is now discussed with reference to different intervals for the shift degree. For example, a control signal "src1<8" is provided to indicate when the shift degree is less than eight. The input to the shifter 402 is src2(39:32). The data in src2(39:32) is received as an operand in conjunction with src2(31:0) and contains the upper bits of data that is to be shifted by the shift degree. When the shift degree is less than eight, the upper eight bits (39:32) of bus src2 are shifted left to compute the final result. The (upper) eight bits of src2(39:32) are left-shifted in shifter 402 by the value of the lower three bits of the shift degree src1(2:0). Because the upper eight bits (39:32) of bus src2 are stored in a register, shifter 402 can perform the shift in parallel (e.g., at the same time as) with the relatively complex rotator 300 (which has over four layers of multiplexer delays plus masking logic) and thus shifter 402 is not part of the critical path. Shifter 402 shifts the input values of src2(39:32) by an amount specified by src1 and are passed by multiplexer 404 if the shift degree is less than eight (under the control of signal src1<8).

Because the rotator 300 is a left-rotator, the MSBs (most significant bits) of the data are rotated into the LSBs (least significant bits) of bus rotl_out(31:0). Thus left-rotator 300 circularly rotates the bits of the data to be shifted in a "round robin" fashion where each bit that is shifted out (from a left "end" of the word) is sequentially shifted in to the vacated bit position that is on the opposing side of the left end. Accordingly, the MSBs of src1(31:0) are present within the (shifted) LSBs of the output rotl_out(31:0). Bit-wise selector 406 perform a bit-wise selection by using a mask (from multiplexer 416, described below) to individually select one bit between of each bit of a shift result obtained by left-shifting the upper eights bits of the shift data (which is src2(39:32)) and a each bit of a rotate result (which are present in the lower eight bits of the rotator rotl_out(7:0)). The mask logic in rmask (rotate mask) table 408 (and rmask table 414) uses information from that required by the 32-bit rotator 300 and is shown in Table 1 as follows:

TABLE 1

| Rmask computation logic | |
|---|---|
| Src1(5:0) | Rmask(31:0) |
| 000000 | 00000000000000000000000000000000 |
| 000001 | 00000000000000000000000000000001 |
| 000010 | 00000000000000000000000000000011 |
| 000011 | 00000000000000000000000000000111 |
| 000100 | 00000000000000000000000000001111 |
| 000101 | 00000000000000000000000000011111 |
| 000110 | 00000000000000000000000000111111 |
| 000111 | 00000000000000000000000001111111 |
| 001000 | 00000000000000000000000011111111 |
| ... | ... |
| 011110 | 00111111111111111111111111111111 |
| 011111 | 01111111111111111111111111111111 |
| 1xxxxx | 00000000000000000000000000000000 |

The rmask (rotate mask) logic in an embodiment is conveniently implemented as a programmable logic array, which uses around two-to-three levels of logic gates (thus providing two or three "gate levels" of delay, as discussed above). The rmask logic performs a "right-most ones detection" based on the shift degree src1 (5:0), of which src1(5) is zero. For a given interval of the shift degree (less than eight, here), the rmask table 414 selects the associated lower eight bits of the rmask output and uses the selected mask to perform a bit-wise selection between each bit of the output of the shift left bus (shl_out) and each respective bit of the rotator (rotl_out) output.

For example, if the shift degree is "4," then the rmask table 414 output is "0x0f." Multiplexer 416 selects and outputs in the input value of 0x0f (because control signal src1(5) is zero when the shift degree is less than eight). The bit-wise selector 406 receives the value of 0x0f from multiplexer 416 and in response passes the upper four bits of shl_out (bits 7:4) from the shifter 402 via multiplexer 404 to dst(39:36) and similarly passes the lower four bits of rotl_out (bits 3:0) to dst(35:32). Thus, the upper eight bits of the result, dst(39:32) is correct when the shift degree is less than eight.

When the shift degree is eight or more, but less than 31 (8≤src1 (5:0)<31), the upper eight bits of the shift data (namely, src2(39:32)) are shifted out of the result such that the (shift left output) bus shl_out(7:0) is assigned the value of 0x00 by multiplexer 404. The output rotl_out(7:0) of the rotator 300 includes the MSBs of src2(31:0) rotated left by the shift degree src1(5:0). The rmask output will read 0xff, as only the lowest eight bits are output and used from rmask table 414. Multiplexer 416 selects and outputs the input value of 0xff (because src1 (5) is zero when the shift degree is less than 32). The bit-wise selector 406 receives the value of 0xff from multiplexer 416 and in response selects the output of the (left) rotator 300: namely, rotl_out(7:0). Accordingly, when the shift degree is eight or more, but less than 32, bit-wise selector 406 correctly passes rotl_out(7:0) to dst(39:32).

When the shift degree is 32 or more, but less than 39 (32≤src1(5:0)<39), special handling is used because not all eight LSBs of the rotator 300 output (namely, rotl_out(7:0)) are preserved, except for the "corner case" shift degree of 32. Accordingly a relatively small mask decoding table (forty rmask table 410) is used to determine which of these bits to preserve, based on the shift degree. The logic is forty rmask table 410 is shown in Table 2 as follows:

TABLE 2

| Forty_rmask computation logic | |
|---|---|
| Src1(2:0) | Forty_rmask(7:0) |
| 000 | 11111111 |
| 001 | 11111110 |
| 010 | 11111100 |
| 011 | 11111000 |
| 100 | 11110000 |
| 101 | 11100000 |
| 110 | 11000000 |
| 111 | 10000000 |

Comparing Table 2 with Table 1, it can be seen that Table 2 contains masks that are complementary to a corresponding portion of the Table 1, where the corresponding portion of Table 1 includes the lower eight bits, with each of the lower eight bits being an inversion of a corresponding bit in Table 2. Accordingly, the values of Table 2 can be formed by inverting the corresponding values in Table 1.

Thus, when the shift degree is 32 or more, but less than 40, the output forty_rmask(7:0) from forty rmask table 410 takes precedence over rmask(7:0) from rmask table 408. (Rmask table 408 can be implemented similarly to rmask table 414 by sharing portions of the mask logic block 312 of rotator 300). Multiplexer 412 implements this precedence by selecting the input forty_rmask(7:0) when 32<=src1<=39. Multiplexer 416 selects and outputs forty_rmask(7:0) as the selected mask (because src1(5) is zero when the shift degree is less than 32). The selected mask (output from multiplexer 416), when applied to the bit-wise selector 406, selects the appropriate bits of rotl_out(7:0) when the corresponding bit of forty_r-mask(7:0) is set, and will pass a "0" otherwise.

For example, when the shift degree is 36, src1(2:0)="100" is received by forty rmask table 410, which produces an output of forty_rmask(7:0)=11110000. Thus, dst(39:36) of the output of bit-wise selector 406 generates an output having rotator output rotl(7:4) as the higher order bits, while the lower-order bits dst(35:32) are output as "0000." Thus, when the shift degree is 32 or more, but less than 39, the extended-width left-shifter 400 effectively emulates the example shift operation having a left-shift of four bits. Similar reasoning applies to the other shift degrees within this range.

When the shift degree is 40 or greater, any value to be shifted would be completely shifted out of the shift register, and the resulting value would thus be each bit having a value of zero (all zeros). Multiplexer 412 implements this precedence by selecting the input rmask(7:0) from rmask table 408 because the logical condition src1>=40 is satisfied. Multiplexer 416 selects and outputs rmask(7:0) as the selected mask (because src1(5) is one when the shift degree is 32 or greater. Thus, when the shift degree is 40 or greater, the rmask logic again takes precedence and results in all zeros being passed to dst(39:32), which again correctly emulates a conventional forty-bit shifter.

Thus, for all possible shift degrees, one additional multiplexer level (e.g., bit-wise selector 406) is encountered after the output rotl_out(31:0) is obtained from the 32-bit left rotator 300. As shown in FIG. 3, the masking logic in the rotator 300 adds around one-to-two logic levels for the rotator output (which is typically provides delays at least as long as the delay produced by bit-wise selector 406). Thus, the disclosed implementation ensures that the total path delay for the 40-bit instructions is not longer than that for the 32-bit instructions.

The 40-bit combined shift result can be obtained by combining the rotated second portion of the data word with the extended-width result. Thus, the combined shift result has a width that is greater than the 32-bit width of rotator 300. The 40-bit combined shift result (see 418) can be obtained by concatenating the rotated second portion of the data word (as lower bits) with the extended-width result (as higher bits).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An extended-width shifter, comprising:
   a rotator arranged to sequentially rotate each bit of a first portion of a data word by a number of bit positions that is indicated by a first portion of a received shift degree to generate a rotation result, wherein each bit rotated out of the received first portion of a word is sequentially rotated in to an opposing vacated portion of the received first portion of a word to generate a wrap-around portion of the rotation result;
   a shifter arranged to sequentially shift each bit of a second portion of the data word by a number of bit positions that is indicated by a second portion of the received shift degree to generate a shift result, wherein the second portion of the shift degree includes lower-order bits of the first portion of the shift degree; and
   a bit-wise selector that is arranged to produce an extended-width result by using a mask to individually select one bit between of each bit of the shift result and each bit of a portion of the rotation result that includes the wrap-around portion of the rotation result, wherein the mask is selected at least in response to the second portion of the shift degree.

2. The device of claim 1, wherein the data word includes 40 bits, the first portion of the data word includes the lower 32 bits of the data word, and the second portion of the data word includes the upper eight bits of the data word.

3. The device of claim 1, wherein the first portion of the data word includes the lower bits of the data word and the second portion of the data word includes the upper bits of the data word, wherein the first portion of the portion of the data word does not include any bits of the second portion of the data word.

4. The device of claim 3, wherein the extended-width result includes the wrap-around portion of the rotation result when the first portion of the shift degree is less than the width of the second portion of the data word.

5. The device of claim 4, wherein the extended-width result includes a portion of the shift result when the first portion of the shift degree is less than the width of the second portion of the data word.

6. The device of claim 1, wherein the mask is selected from a first mask table when the shift degree is equal to or greater than the width of the first portion of the data word but less than the width of the extended result and the mask is selected from a second mask table when the shift degree is equal to or greater than the width of the extended result.

7. The device of claim 6, wherein the first mask table and the second mask table include an entry for at least each of the possible values of second portion of the shift degree.

8. The device of claim 7, wherein second mask table contains masks that are complementary to a corresponding portion of the first mask table.

9. The device of claim 6, wherein the values of the second mask table are formed by inverting a mask received from the first mask table.

10. The device of claim 1, wherein the data word includes 40 bits, the first portion of the data word includes the lower 32 bits of the data word, and the second portion of the data word includes the upper eight bits of the data word, and wherein the mask is selected from a first mask table when the shift degree is equal to or greater than 32 bits but less than 40 bits and the mask is selected from a second mask table when the shift degree is equal to or greater than 40 bits or less than 32 bits.

11. The device of claim 1, wherein the rotated second portion of the data word is combined with the extended-width result to form a combined shift result having a width that is greater than the width of the rotator.

12. The device of claim 11, wherein the rotated second portion of the data word has a width of 32 bits and is combined with the extended-width result to form a combined shift result having a width of 40 bits.

13. A processing system, comprising:
   a memory arranged in a substrate for storing instructions to be executed and for storing data to be manipulated; and
   at least one processor arranged in the substrate for executing the stored instructions and to manipulate the stored data, the at least one processor comprising a shift device arranged to sequentially rotate each bit of a first portion of a data word by a number of bit positions that is indicated by a first portion of a received shift degree to generate a rotation result, wherein each bit rotated out of the received first portion of a word is sequentially rotated in to an opposing vacated portion of the received first portion of a word to generate a wrap-around portion of the rotation result, to sequentially shift each bit of a second portion of the data word by a number of bit positions that is indicated by a second portion of the received shift degree to generate a shift result, wherein the second portion of the shift degree includes lower-order bits of the first portion of the shift degree, and to produce an extended-width result by using a mask to individually select one bit between of each bit of the shift result and each bit of a portion of the rotation result that includes the wrap-around portion of the rotation result, wherein the mask is selected at least in response to the second portion of the shift degree.

14. The system of claim 13 wherein the first portion of the data word includes the lower bits of the data word and the second portion of the data word includes the upper bits of the data word, wherein the first portion of the portion of the data word does not include any bits of the second portion of the data word.

15. The system of claim 14 wherein the extended-width result includes the wrap-around portion of the rotation result and includes a portion of the shift result when the first portion of the shift degree is less than or equal to the width of the second portion of the data word.

16. The system of claim 14 wherein the mask is selected from a first mask table when the shift degree is equal to or greater than the width of the first portion of the data word but less than the width of the extended result and the mask is selected from a second mask table when the shift degree is equal to or greater than the width of the extended result or is less than the width of the first portion of the data word.

17. The system of claim 16 wherein the rotated second portion of the data word is combined with the extended-width result to form a combined shift result having a width that is greater than the width of the rotation result.

* * * * *